United States Patent
Henkel et al.

(10) Patent No.: US 8,458,388 B2
(45) Date of Patent: Jun. 4, 2013

(54) METHOD FOR DATA COMMUNICATION BETWEEN A PROGRAMMABLE CONTROLLER AND A DATA PROCESSING DEVICE AND INTERFACE DRIVER PROGRAM AND INTERFACE HERETO

(75) Inventors: Marco Henkel, Minden (DE); Wolfgang Adler, Bad Oeynhausen (DE); Christoph Korf, Seggebruch (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 71 days.

(21) Appl. No.: 12/868,094

(22) Filed: Aug. 25, 2010

(65) Prior Publication Data

US 2011/0055448 A1    Mar. 3, 2011

(30) Foreign Application Priority Data

Aug. 27, 2009    (DE) .......................... 10 2009 038 760

(51) Int. Cl.
*G06F 13/20*    (2006.01)
*G06F 13/38*    (2006.01)

(52) U.S. Cl.
CPC .................................. *G06F 13/385* (2013.01)
USPC .......................................... 710/313; 710/315

(58) Field of Classification Search
USPC ................... 710/300–317, 8–19, 1–2
See application file for complete search history.

(56) References Cited

U.S. PATENT DOCUMENTS

| | | | |
|---|---|---|---|
| 7,082,598 B1 * | 7/2006 | Le et al. | 717/127 |
| 7,400,648 B2 | 7/2008 | Cromer | |
| 7,412,544 B2 | 8/2008 | Gibson | |
| 7,577,735 B1 | 8/2009 | Groote | |
| 7,673,089 B2 * | 3/2010 | Hinchey | 710/300 |
| 2002/0178295 A1 | 11/2002 | Buczek et al. | |
| 2008/0155165 A1 * | 6/2008 | Mei et al. | 710/316 |
| 2008/0177922 A1 * | 7/2008 | Chow et al. | 710/302 |
| 2008/0301764 A1 * | 12/2008 | Jayet et al. | 726/1 |
| 2009/0055560 A1 * | 2/2009 | Kanai | 710/63 |

FOREIGN PATENT DOCUMENTS

EP    1 158 406    11/2001

* cited by examiner

*Primary Examiner* — Raymond Phan
(74) *Attorney, Agent, or Firm* — Whitham, Curtis, Christofferson & Cook, P.C (57) ABSTRACT

A method for data communication between a programmable controller (2) and a data processing device (12) via a universal data interface (11b) of the data processing device (12) is described. In the method, at least one communication interface implemented by means of software drivers and selected in dependence on the availability is allocated to a programmable controller (2) connected to a hardware connection in a wire-connected manner or wirelessly. The method has the following steps:

reading at least one identification of the programmable controller (2) out of at least one data memory of the programmable controller (2);

selecting at least one further communication interface in dependence on the at least one identification read out; and allocating the at least one selected communication interface to the hardware connection in such a manner that the data communication takes place both via the at least one communication interface selected in dependence on the availability and via the at least one communication interface selected in dependence on the identification.

13 Claims, 4 Drawing Sheets

METHOD FOR DATA COMMUNICATION BETWEEN A PROGRAMMABLE CONTROLLER AND A DATA PROCESSING DEVICE AND INTERFACE DRIVER PROGRAM AND INTERFACE HERETO

FIELD OF THE INVENTION

The invention relates to a method for data communication between a programmable controller and a data processing device via a universal data interface of the data processing device, in which at least one communication interface selected in dependence on the availability is allocated to a programmable controller connected to a hardware connection in a wire-connected manner or wirelessly.

The invention also relates to an interface driver program having program code means for execution on a data processing device and to an interface converter having a converter unit and having at least one data interface for connecting programmable controllers and at least one universal data interface for connecting a data processing device, the data interfaces being connected to the converter unit.

BACKGROUND

Devices of automation technology often have a service interface which, in particular, is implemented as a serial interface. Via this service interface, the user can configure the connected programmable controllers via a data processing device which is, for example, a portable computer, with the aid of a configuration program running on the data processing device.

However, it is also conceivable that measuring and control data are exchanged between the connected programmable controller and a data processing device via the service interface.

When a programmable controller is connected to the data processing device, the user must ensure that the correct communication interface is set by means of which the connection to the communication software is effected with the programmable controller. Otherwise, either no communication is possible or the user communicates unintentionally with a wrong programmable controller, also connected via a different communication interface, without noticing it. The communication can be effected for the configuration including parameterization, for the programming or for the diagnosis of the programmable controller or also for exchanging process data etc.

The configuration of decentralized devices by a serial USB interface is known, for example, from U.S. Pat. No. 7,412,544 B2, US 2002/0178295 A1 and EP 1 158 406 A2.

The systems use the standardized USB interface which provides a bit-serial bus in which individual bits of a data packet are transmitted successively. In this arrangement, the data transmission is symmetric via two twisted lines, in which one line transmits the data signal and the other one transmits a signal which is inverted thereto. Two other lines are used for supplying the connected devices with power. The devices connected to one another via a USB (universal serial bus) connection are coupled electrically in a point-to-point connection. The specification mandatorily requires a one-to-one correspondence of a USB device with a virtual interface, generated by means of interface drivers, for USB connections by means of the serial number of the connected USB device. This leads to a free, available virtual interface being selected by the interface driver by means of the serial number of the connected USB device when a USB device is connected so that a different interface is allocated to each USB device. This generation of virtual USB COM ports is described, for example, in U.S. Pat. No. 7,400,648 B2.

U.S. Pat. No. 7,577,735 B1 discloses a method for recognizing a target device on an interface connection of a multiplicity of virtual interfaces, in which a second interface connection of the number of virtual interfaces is allocated to a main device when the second interface connection is available.

U.S. Pat. No. 7,412,544 B2 discloses a method and system which allows a subscriber to use a remote USB device. For this purpose, a plurality of USB devices are coupled to a management module.

This automatic selection of interfaces in dependence on the instantaneous occupation of connections with USB devices which is uncontrollable for the user, leads to the user having to continuously manually change the interface settings in all applications which access such USB devices. Apart from this loss of comfort, the flexible generation of COM ports also harbors the risk of communicating unintentionally with wrong USB devices.

SUMMARY

It is the object of the present invention, therefore, to specify an improved method for data communication between a programmable controller and a data processing device via a universal data interface of the data processing device by means of which the definition of the communication interfaces can be improved.

The object is achieved by means of the method of the type initially mentioned, by determining additionally at least one further communication interface with the steps of:

reading at least one identification of the programmable controller out of at least one data memory of the programmable controller;

selecting at least one further communication interface in dependence on the at least one identification read out, and allocating the at least one selected communication interface to the hardware connection in such a manner that the data communication takes place both via the at least one communication interface selected in dependence on the availability and via the communication interface selected in dependence on the identification.

According to the teaching of the present invention, the communication interface selected in one-to-one correspondence in dependence on the availability according to the specification for the connected programmable controller is thus duplicated and at least one further communication interface is to be selected and allocated to the programmable controller via which the communication between data processing device and programmable controller is carried out both via one and via the other interface. This at least one further communication interface is selected in dependence on at least one identification of the programmable controller.

It is thus possible that a user who has connected a new programmable controller does not need to newly set the interface every time. Instead, the setting of the communication interface can remain set to at least one known configuration interface address (e.g. COM port), for example in the configuration program of the data processing device. Programmable controllers which are actually mapped on different communication interfaces selected in dependence on availability can be addressed via the at least one additional (mirrored) communication interface.

The universal data interface of the data processing device can be arranged integrated in a processor-controlled computing unit (e.g. computer) or as a separate interface adaptor which is connected to the processor-controlled computing unit via a standard interface.

The method can be used, in particular, in conjunction with a universal bit-serial USB data bus as universal data interface in which virtual software communication interfaces in the form of serial COM ports are generated by interface drivers.

To select the at least one further communication interface, a manufacturer identification, e.g. the vendor ID defined in the USB standard, which is stored in a programmable controller, can be used as identification, for example. In this manner, a permanently defined communication interface can be assigned to all programmable controllers of a manufacturer. In the case of a programmable controller with USB connection, the vendor. ID is in any case stored as a mandatory component of the USB interface.

It is of advantage if a product identification such as, e.g., the product ID of a USB interface which is stored in the programmable controller is used as identification for the selection of the further communication interface. This identification can be considered by itself or in combination with other identifications such as, for example, the manufacturer identification.

The product identification is an identification of the product type which can be stored separately or as part of a serial number in the programmable controller.

It is particularly advantageous if a product category identification is used as identification for the selection of the at least one further communication interface. In this manner, it is possible to combine various product types of a common category and, in conjunction with a configuration tool for such a category, to preset the tool to a communication interface for all product types of the same category.

For programmable controllers, for example for building automation, programmable controllers of the "heating" category, other programmable controllers of the "lift" category and other programmable controllers of the "access control" category can be allocated, for example. For programmable controllers which are provided for process automation, categories for different production sections or production methods can be provided, for example.

However, user-definable identifications which are stored in the programmable controllers can also be considered as identification in the selection of the at least one further communication interface.

The various types of identifications mentioned can be used either separately for selecting the at least one further communication interface. But it is also conceivable that a combination of different identifications or different components of at least one identification are linked to one another in order to select from the linking of the several identifications or several components, respectively, a corresponding allocated communication interface.

When using the serial number as identification, it is conceivable that, in dependence on availability, a communication interface with one-to-one correspondence for the serial number is allocated to the programmable controller on first registration. Subsequently, the serial number can then be changed into an identification number possibly without one-to-one correspondence so that a further communication interface dependent on this changed serial number is then allocated to the programmable controller for this changed serial number. The USB programmable controller is registered several times in this manner (e.g. twice) although it is physically connected only once.

In the method for data communication described, a problem may occur when two or more programmable controllers are connected simultaneously which, due to their comparable identification, use the same further communication interface selected in dependence on the identification. In this case, a configuration tool acts simultaneously on all programmable controllers which use the same further communication interface so that an individual configuration is not possible. The user may hot recognize which of the programmable controllers is influenced by the configuration.

It is therefore of advantage, if a programmable controller already connected is deactivated to which at least one communication interface selected in dependence on the identification is allocated which, due to the same identification for a further programmable controller connected later is also to be used for the latter. This ensures that it is always the programmable controller connected last which is addressed by the further communication interface selected in dependence on the identification. In this manner, other programmable controllers using the same communication interface and connected earlier are disconnected from the communication interface without the latter having to be removed physically from the data interface.

For this purpose, the at least one communication interface selected in dependence on the identification is deactivated for a programmable controller already connected when a further programmable controller having the same identification is connected. Subsequently, the deactivated communication interface can be allocated to the newly connected further programmable controller and the communication interface can be activated for this programmable controller.

However, it is optionally also conceivable that when the communication interface is occupied by a programmable controller already connected, the assignment of communication interfaces for the newly connected programmable controller is refused in the case of a new connection of a further programmable controller containing the same identification. In this case, e.g., a warning message can be issued. Optionally, a manual allocation of the communication interfaces predetermined in dependence on the identification, including various. Ethernet ports, to the competing programmable controllers can be provided by a suitable programming of the configuration tool (e.g. configuration software, special interface tools or driver settings).

Another possibility consists in that the colliding programmable controllers, i.e. at least one programmable controller already connected and one newly connected controller having the same identification, are deactivated in order to prevent an unintentional misparameterization.

As a rule, the communication interfaces are identified by addresses with one-to-one correspondence. It is advantageous in this context to calculate the address of the communication interface selected in dependence on the at least one identification from a combination of components of the at least one identification or from a number of identifications. It is then only necessary to specify a functional relationship between the address of the communication interfaces and the identification for the allocation.

It is also conceivable, however, to select the communication interface by means of a list which is stored, for example, in the data processing device and contains an assignment of in each case an identification, a combination of identifications or of components of at least one identification to addresses of communication interfaces. After the at least one identification has been read out of the programmable controller, the (mirrored) further communication interface to be assigned to the programmable controller can then be automatically picked from the list.

The method can be advantageously implemented in an interface driver program with program code means for execution on a data processing device. The program code means are then programmed in such a manner that they execute the method described above when the interface driver program is executed on the data processing device. Thus, the method can be implemented, e.g. as part of a USB driver, in the latter and executed automatically when a further USE programmable controller is connected to a USB connection of the data processing device.

However, the method can also be implemented in an interface converter which is provided as a separate device which is connected between the programmable controller and the data processing device. In this arrangement, the interface converter has a converter unit and at least one data interface for connecting programmable controllers and at least one universal data interface (e.g. USE, RS 232, Centronics or the like) for connecting a data processing device, the data interfaces being connected to the converter unit. In this arrangement, the converter unit preferably contains a microprocessor or a microcontroller which executes the method described above under program control. For this purpose, the converter unit is preferably set up, by programming for establishing a communication channel between a connected programmable controller and a connected data processing device via at least one first available communication interface, for selecting at least one further communication interface in dependence on the at least one identification read out and for allocating the at least one selected communication interface to the hardware connection, in such a manner that the data communication takes place both via the at least one communication interface selected in dependence on the availability and via the communication interface selected in dependence on the identification.

In principle, the converter unit can be set up, for example, for communication protocol and/or level conversion and can thus also perform an adaptation between different types of interfaces of the data processing device and of the programmable controllers, in addition to the interface allocation described.

It is advantageous if the interface converter is equipped with a converter unit and at least one data interface for connecting programmable controllers and with at least one universal data interface for connecting a data processing device, the data interfaces being connected to the converter unit and the interface converter being set up for reading out at least one identification of the programmable controller from at least one data memory of the programmable controller and for selecting a communication channel between the programmable controller and a data processing device selected from a plurality of connected data processing devices, in dependence on the identification. In this manner, the identification of the programmable controller controls, via an interface selection, the connection to a data processing device allocated to the identification.

In the case of colliding identifications for programmable controllers already connected and newly connected, the communication channel to the colliding programmable controller already connected can be disconnected and/or the setting-up of a communication channel to the newly connected programmable controller can be refused.

Advantageous embodiments are described in the subclaims.

DESCRIPTION OF THE DRAWINGS

In the text which follows, the invention will be explained in greater detail by means of an illustrative example, with reference to the attached drawings, in which.

DETAILED DESCRIPTION

Figure 1:
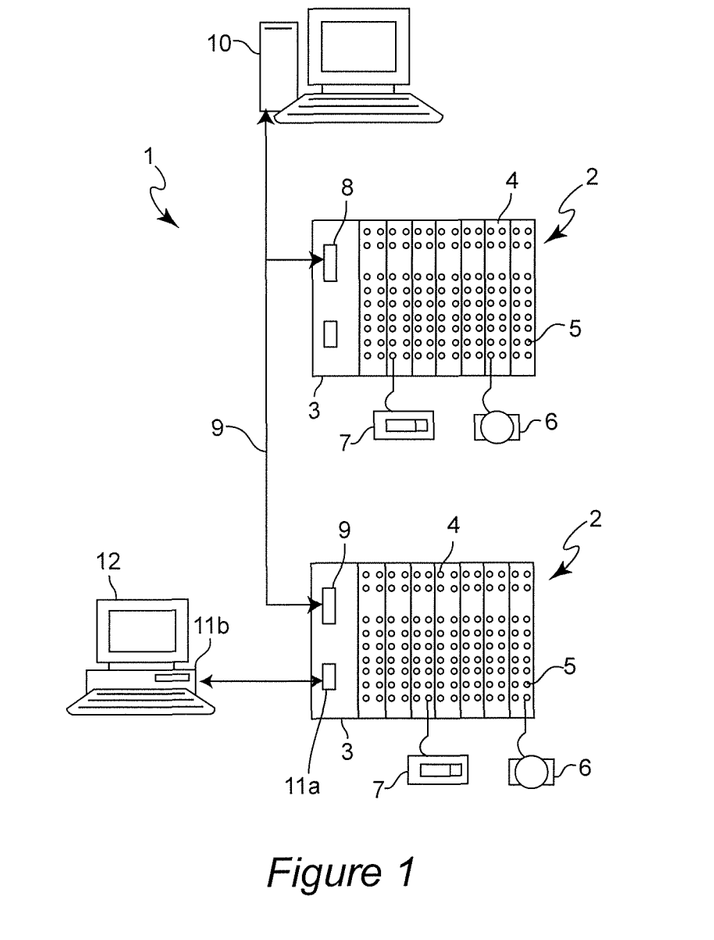
FIG. 1 shows a block diagram of an automation system with a data processing device and with programmable controllers connected via a data interface.

FIG. 1 shows a block diagram of an automation system 1 which has at least one programmable controller 2 which is configured as a field bus coupler 3 in the illustrative embodiment shown. The field bus coupler 3 forms a head module for further input and/or output modules 4 connected to it via an internal bus. These input and/or output modules 4 have in a manner known per se connecting terminals 5 for connecting field devices which can be, for example, actuators 6 or sensors 7.

The field bus coupler 3 also has a field bus interface 8 for connecting a field bus 9. Such field bus systems are standardized and are known, for example, as profibus, modbus, Ethernet IP etc.

Further field bus couplers 3 with input and/or output modules 4 coupled thereto via an internal bus and central control computers 10 can be coupled to the field bus 9 in order to form a complex automation system for controlling, regulating and/or monitoring buildings or processes.

Such automation systems 1, known per se, are used in building automation and process automation, e.g. for process engineering installations or manufacturing installations.

At least one of the programmable controllers 2 has a universal data interface 11a which is preferably configured as USB interface according to the Universal Serial Bus standard. A data processing device 12 which is preferably used for configuring the programmable controller 2 and possibly the input and/or output modules 4 connected thereto can be connected to this universal data interface 11a. For this purpose, a configuration program via which the programmable controller 2 and the connected input/output modules 4 and possibly also connected bus users can be configured is installed on the data processing device 12. Such configuration programs are sufficiently well known per se.

In the programmable controller 2, a software driver for the universal data interface 11a is installed which monitors the control of the data communication via the data interface 11a. In the same manner, a corresponding interface driver for the corresponding universal data interface lib of the data processing device 12 is implemented on the data processing device 12.

Furthermore, an identification for the programmable controller 2 is stored in a memory in the programmable controller 2. This identification can be, fox example, the vendor identification and the product identification which must be provided as standard in a USB-compatible terminal in order to set up an unambiguous point-to-point connection between the data processing device 12 and the programmable controller 2 via the universal data interface 11a, 11b.

The interface driver in the data processing device 12 reads out in a manner known per se, as prescribed by the USB standard, the manufacturer's identification and the product identification from the programmable controller 2 after the universal data interface 11a of the programmable controller 2 has been connected to the universal data interface 11b of the data processing device 12. Then, a communication interface in the form of a COM port, which is currently available and not yet occupied by another device, is assigned to this unambiguously identifiable programmable controller 2. This assignment of the COM port is carried out anew every time a programmable controller 2 is connected. The selection of the actual COM port can thus change and cannot be permanently allocated since this would contradict the rules of the USB standard.

An identification of the programmable controller 2 is then read out. This identification can be a manufacturer's identification, a product identification and/or a user-definable identification. The product identification used can be either a serial number or preferably a product category or product type identification.

This identification is then used for assigning a further communication interface, allocated to this identification, for the universal data interface 11b so that a communication interface selected unambiguously in dependence on the availability and in addition to this unambiguous communication interface at least one further communication interface is, for example in the form of COM ports, allocated to the programmable controller 2 connected to the universal data interface 11b.

The communication via the universal data interface 11b thus takes place by utilizing the virtual further communication interfaces operated in parallel. The selection can be carried out either with the aid of a list which is stored in the data processing device 12 and contains an assignment in each case of an identification, of a combination of identifications or components with at least one identification to addresses of communication interfaces. As an alternative, it is also conceivable that the further communication interfaces are selected with the aid of a functional relationship, using the at least one identification, combination of identifications or components of at least one identification as variable quantities of the functional relationship, determining the selection. This is possible, in particular, in the case of user-definable identifications when the further communication interfaces can be unambiguously referenced via their address such as, e.g. the COM port number.

As shown, the universal data interface lib of the data processing device 12 can be integrated in a processor-controlled computing unit (e.g. computer) or also configured as separate interface adaptor which is connected to the processor-controlled computing unit via a standard interface. The totality of processor-controlled computing unit (e.g. computer) and integrated or separate universal data interface 11b forms the data processing device 12.

Figure 2A:
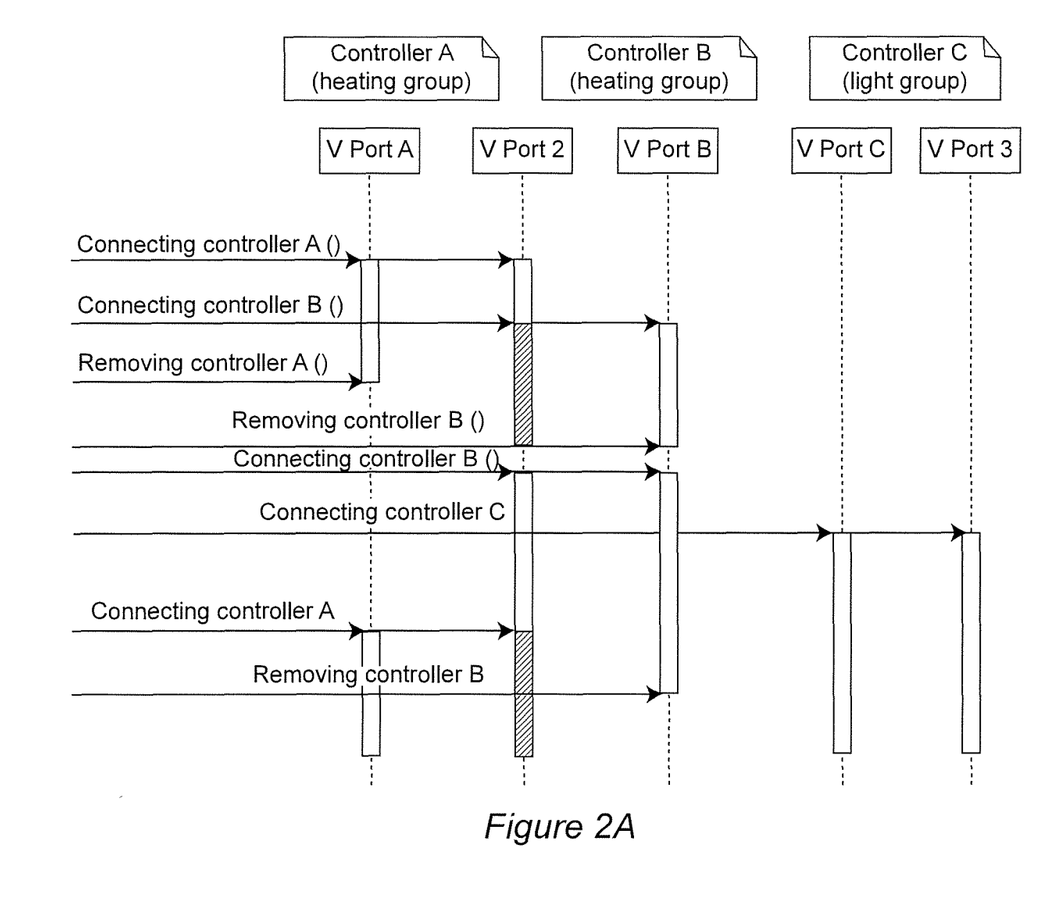
FIGS. 2a & 2b show state diagrams for representing different variants of the method for the allocation of communication interfaces.
Figure 2B:
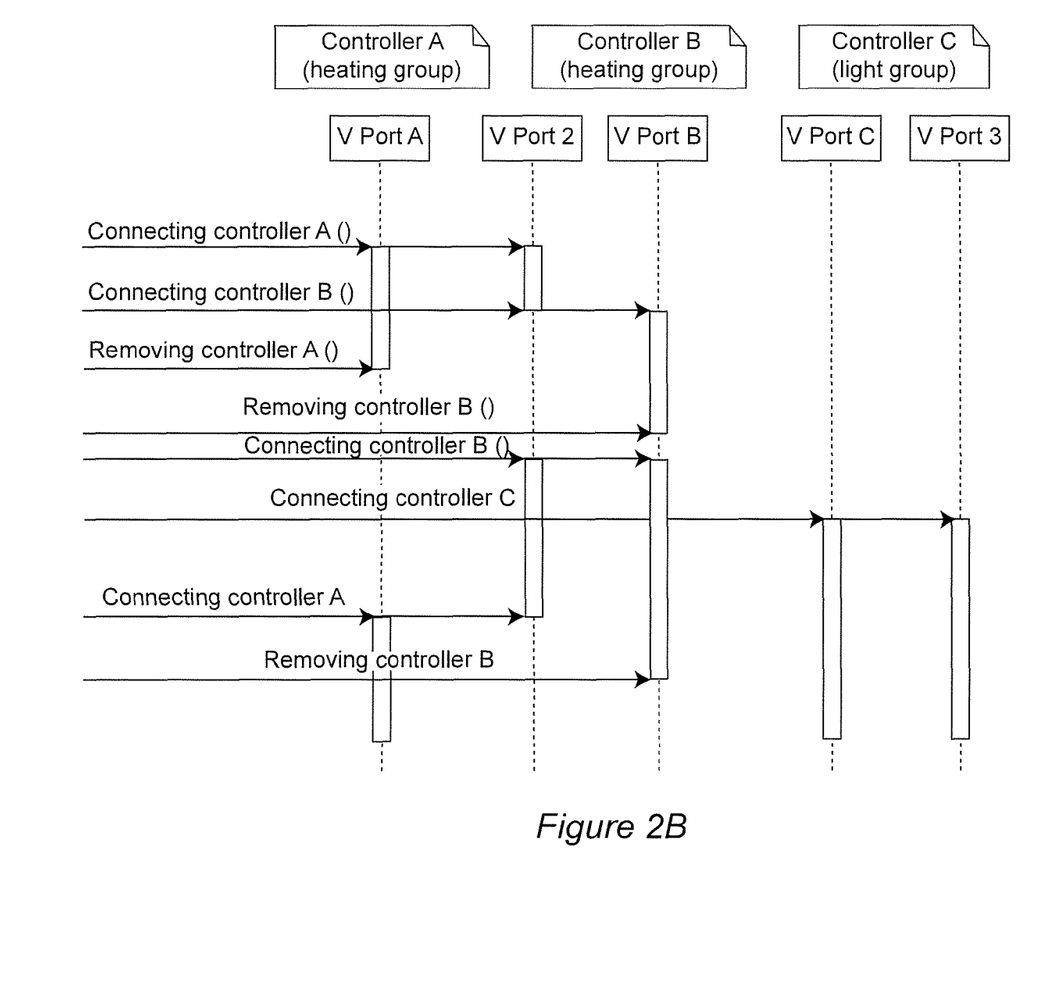

FIGS. 2a and 2b show a state diagram for representing different variants of the method for the allocation of communication interfaces. In this context, it is assumed that two groups of devices are defined for the programmable controllers 2, namely, on the one hand, the "heating" group of devices for programmable controllers for heating control and the "light" group of devices for the programmable controllers for controlling light in building automation.

It is assumed that three different programmable controllers A, B, C are connected to a universal data bus, the programmable controllers A and B being allocated to the "heating" group of devices, and the programmable controller C being allocated to the "light" group of devices. When the first programmable controller A is connected to a USB interface of the data processing device, a virtual communication interface is assigned to the programmable controller A by the USB driver in the form of the COM port Vport A. This is a free COM port unambiguously assigned to this programmable controller A. Furthermore, a further communication interface in the form of the virtual COM port Vport 2 is assigned to the programmable controller A so that the data exchange between the programmable controller A and the data processing device takes place via the two interfaces Vport A and Vport 2.

After a further programmable controller B of the same "heating" group of devices is connected, a free available communication interface in the form of the COM port Vport B is allocated to this programmable controller B by the USB interface driver. Furthermore, the further communication interface Vport 2 which is provided for the "heating" group of devices is assigned to the programmable controller B on the basis of the identification for the group of devices, stored in the programmable controller.

The data communication with one of the programmable controllers A and B would be directed to both programmable controllers A and B via the further communication interface Vport 2. This can lead to a configuration which is actually only provided for one of the devices A, B being carried out unintentionally in both devices.

To ensure that only the programmable controller connected last is configured by the data processing device, therefore, the interface driver automatically deactivates the previously connected programmable controller A at the further communication interface Vport 2 after connection of the programmable controller B, in a first variant according to FIG. 2a, if the programmable controllers A and B belong to the same group of devices and thus occupy the same additional communication interface.

The data communication then takes place unambiguously via the communication interfaces Vport B and Vport 2 with the programmable controller B. After configuration has been performed, the programmable controller B can then be removed so that the communication interfaces are released again.

According to a second variant according to FIG. 2b both colliding programmable controllers A and B can also be deactivated. In a third variant, it can also be provided that after a programmable controller is connected, the connection of a further colliding programmable controller is refused.

In the text which follows, the case of a connection of programmable controllers of different groups of devices is shown. After the connection of the programmable controller B, it is assigned the free available communication interface Vport B and the communication interface Vport 2 selected by means of the group of devices and allocated to the latter. After the programmable controller C of the "light" group of devices has been connected, the free communication interface Vport C and a communication interface Vport by means of the group of devices and assigned to the latter is allocated to this programmable controller. Both programmable controllers B and C can thus be unambiguously addressed by a configuration program in the data protesting device.

If subsequently a programmable controller A of the "heating" group is connected, this programmable controller A is assigned the free available communication interface Vport A and the further communication interface Vport 2. Since there is now a dual occupation of the additional communication interfaces Vport 2, the USB interface driver in the data processing device automatically removes the colliding, previously connected programmable controller B from the interface control so that the communication interface Vport 2 and possibly also the communication interface Vport B assigned to this programmable controller B is released. The further communication interface Vport 2 is then occupied only by the programmable controller A last connected so that unambiguous communication is again possible.

Figure 3:
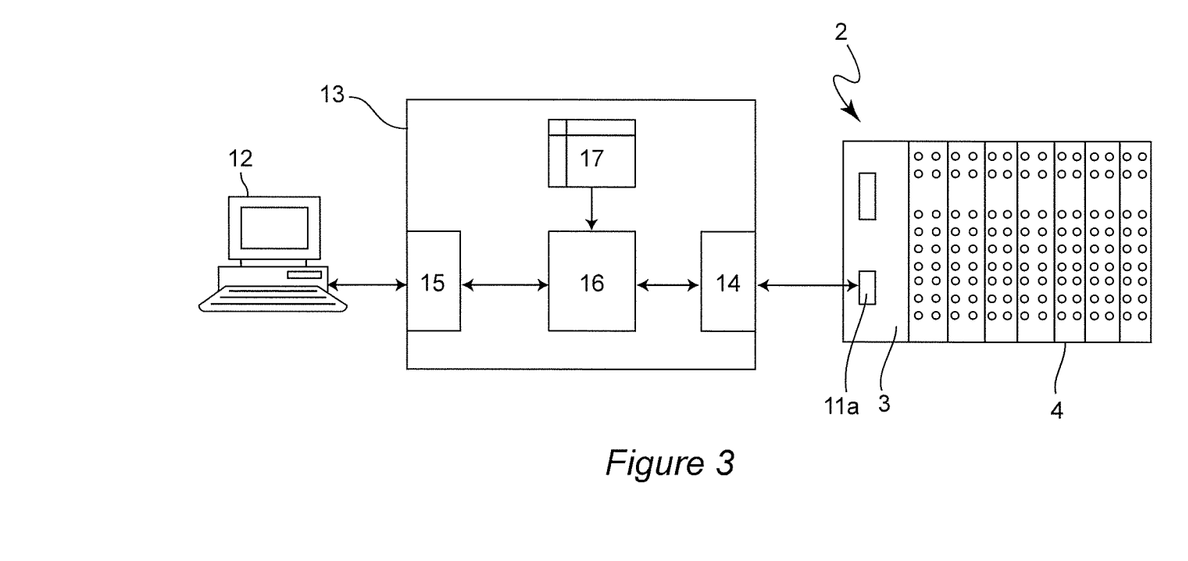
FIG. 3 shows a block diagram of an interface converter with a programmable controller connected thereto and a data processing device.

FIG. 3 shows a block diagram of an interface converter 13 which has a data interface 14 for connecting programmable controllers 2 and at least one universal data interface 15 for connecting a data processing device 12. In this arrangement, the programmable controller 2 is connected to the interface converter 13 via the data interface 11a, e.g. in order in this manner to be able to configure the programmable controller 2.

The interface converter 13 also has a converter unit 16 which is connected to the at least one universal data interface 15 and to the at least one data interface 14. The converter unit 16 can be for example, a programmable microprocessor or microcontroller. In addition to the data transfer between the universal data interface 15 and the data interface 14, the converter unit 16 can also be used, for example, for converting a communication protocol from a format supported by the programmable controller 2 into another communication protocol format supported by the universal data interface 11b, 15, and conversely. Thus, the converter unit 16 can convert, for example, a USB protocol at the universal data interface 15 into a purely serial protocol at the data interface 14 such as, for example an RS232 protocol.

The interface converter 13 also has a data memory 17 in which a list is stored which has an assignment of identifications of the programmable controller 2, of components of an identification or of combinations of various identifications or identification components of the programmable controller 2 to (virtual) communication interfaces which is assigned to the programmable controller 2 in the data processing device 12 in addition to an automatically selected communication interface.

It is possible that, e.g., an interface converter implements a TCP (transmission control protocol) server in the direction of data processing device 12 and maps various programmable controllers 2 to several ports by means of the identifications read out.

The invention claimed is:

1. A method for data communication between a programmable controller and a data processing device via a universal data interface of the data processing device, comprising:
   selecting, a communication interface for data communication between the programmable controller and the data processing device in dependence on availability; and
   determining at least one further communication interface for data communication between the programmable controller and the data processing device by
      reading at least one identification of the programmable controller out of at least one data memory of the programmable controller; and
      selecting at least one further communication interface in dependence on the at least one identification read out; and
   allocating both the at least one selected communication interface and the at least one further communication interface to a programmable controller connected to a hardware connection in either a wire connected or wireless connected manner such that data communication is permitted to take place both via the at least one communication interface selected in dependence on availability and via the at least one further communication interface selected in dependence on the at least one identification.

2. The method according to claim 1, wherein the universal data interface is implemented by means of a universal serial data bus (USB) and both the communication interface and the at least one further communication interface are virtual COM ports.

3. The method according to claim 1, wherein the at least one identification read out for selecting the at least one further communication interface of the programmable controller is selected from one or more of a manufacturer's identification, a product identification, and a user-definable identification.

4. The method according to claim 1, further comprising the step of deactivating the at least one further communication interface selected in dependence on the at least one identification for a programmable controller already connected when a further programmable controller having the same identification is connected.

5. The method according to claim 1, further comprising the step of calculating an address of the at least one further communication interface selected in dependence on the at least one identification from a combination of components of the at least one identification or from a combination of a number of identifications.

6. The method according to claim 1, further comprising the step of reading out an address of the at least one further communication interface selected in dependence on the at least one identification from a predetermined list by comparison in dependence on one or more of at least one identification, a list containing an assignment of in each case one identification, a combination of identifications or components of at least one identification to addresses of communication interfaces.

7. The method according to claim 1, further comprising the step of reading out a serial number of the programmable controller as identification, the serial number being changed into a non-unambiguous identification number in order to allocate a further communication interface dependent on the changed serial number to the programmable controller.

8. A data processing device including in a non-transitory storage medium an interface driver program having program code means for execution on the data processing device, wherein the program code means are configured for carrying out the method according to one of the preceding claims when the interface driver program is executed on the data processing device.

9. The method according to claim 4, further comprising the step of allocating the deactivated communication interface to the further programmable controller.

10. Interface converter, comprising:
    a converter unit
    at least one data interface in or associated with said converter unit for connecting programmable controllers; and
    at least one universal data interface in or associated with said converter unit for connecting a data processing device,
    wherein the converter unit is configured for
       establishing a communication channel between a connected programmable controller with a connected data processing device via at least one first available communication interface for reading out at least one identification of the programmable controller from a data memory of the programmable controller,
       selecting at least one further communication interface in dependence on the at least one identification read out and allocating both the at least one first available communications interface and the at least one further communication interface to a programmable controller connected to the hardware connection, such that data communication is permitted to take place both via the at least one first available communication interface and via the at least one further communication interface.

11. The interface converter according to claim 10, wherein said converter unit is configured for disconnecting an existing communication link to a programmable controller for the case where a further programmable controller having the same identification is connected.

12. The interface converter according to claim 10, wherein said converter unit is configured to select no communication channel to a newly connected programmable controller if a programmable controller having the same identification is already connected.

13. Interface converter, comprising:
a converter unit;,
at least one data interface in or associated with said converter unit for connecting programmable controllers; and
at least one universal data interface in or associated with said converter unit for connecting a data processing device
wherein the converter unit is configured for
reading out at least one identification of the programmable controller from at least one data memory of the programmable controller,
selecting a communication channel between the programmable controller and data processing device in dependence on the identification from a plurality of connected data processing devices.

\* \* \* \* \*